United States Patent [19]

Newton et al.

[11] 4,014,464
[45] Mar. 29, 1977

[54] HOT MELT DISPENSER AND METHOD OF MAKING ITS MELT BODY

[75] Inventors: Albert Eugene Newton; Richard Montgomery Elliott, both of Beverly, Mass.

[73] Assignee: USM Corporation, Boston, Mass.

[22] Filed: Dec. 9, 1975

[21] Appl. No.: 639,074

[52] U.S. Cl. .................. 222/146 HE; 219/227
[51] Int. Cl.² ............................. B67D 5/62
[58] Field of Search .... 222/146 HE, 146 R, 146 H; 29/157 C, 557, 558, 520, 525; 138/94.3; 219/227; 220/213, 352, 67; 239/566, 602

[56] References Cited
UNITED STATES PATENTS

| | | | |
|---|---|---|---|
| 2,979,234 | 1/1959 | Kamborian | 222/146 HE |
| 3,298,572 | 4/1965 | Newton | 222/146 HE |
| 3,776,426 | 12/1973 | Newton | 222/146 HE |
| 3,851,820 | 12/1974 | Hudson | 239/566 X |

*Primary Examiner*—Stanley H. Tollberg
*Attorney, Agent, or Firm*—Carl E. Johnson; Richard B. Megley; Vincent A. White

[57] ABSTRACT

In a dispenser or applicator of heat softenable material, a melt body has a generally conical melting chamber extending between an inlet and a relatively smaller outlet passage, at least one by-pass interconnected to the melting chamber by a plurality of spaced, radial bores arranged to conduct hot melt from successive outer "layers" of the material as it is being progressively softened, reduced and liquefied in the chamber for flowing to the outlet, and at least one axial auxiliary channel extending between the outlet and the smaller end of the melting chamber for conducting the central core of the last-to-be melted end portion of the material. Preferably the body has a pair of by-passes, a pair of auxiliary channels, encloses a heater, and is of configuration facilitating its economical construction in one piece.

The method aspect features casting or otherwise providing a one-piece melt body of a metal, such as an aluminum alloy, to provide a main conical melt chamber and a cavity for a heater, boring one or more by-passes in the casting from its outlet and toward its inlet end and substantially parallel and adjacent to at least a portion of the outer wall of the melt chamber, boring an axial auxiliary channel to interconnect the outlet to the smaller end of the melt chamber, drilling the casting radially to provide substantially aligned holes interconnecting a by-pass with the melt chamber, inserting an element for instance a plug or ball as by press-fitting in an outer end of each hole, and sealing the outer ends of said holes, preferably simultaneously, by swedging external metal of the casting in overlapping retentive relation to the exterior portions of the elements.

9 Claims, 10 Drawing Figures

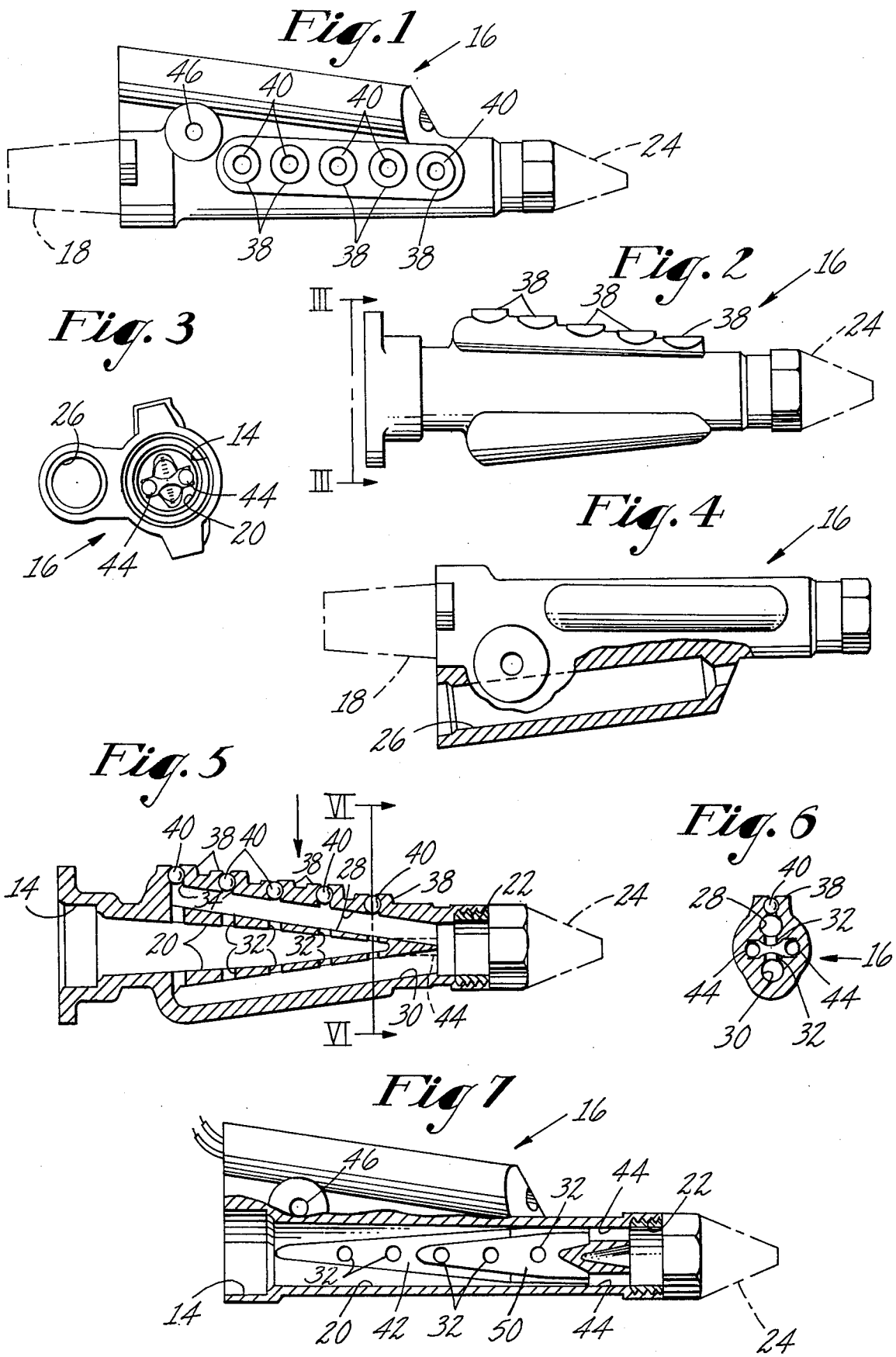

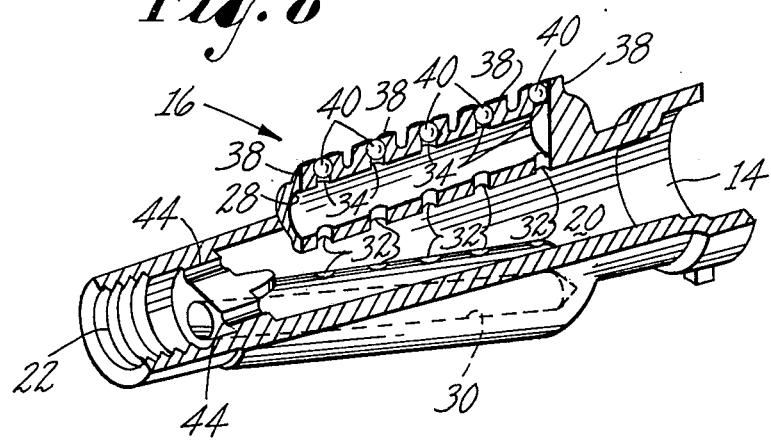
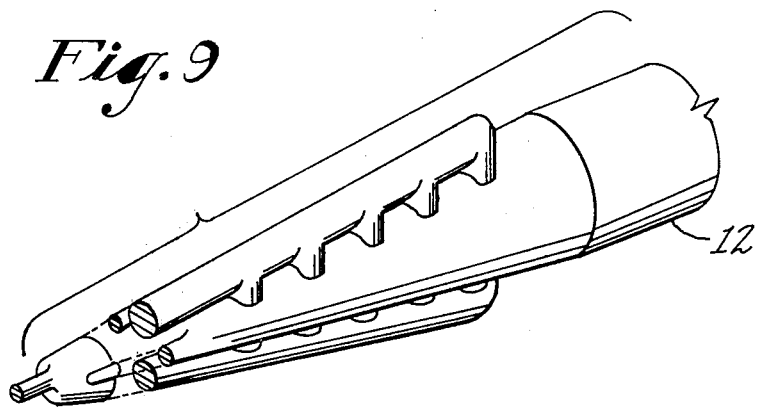
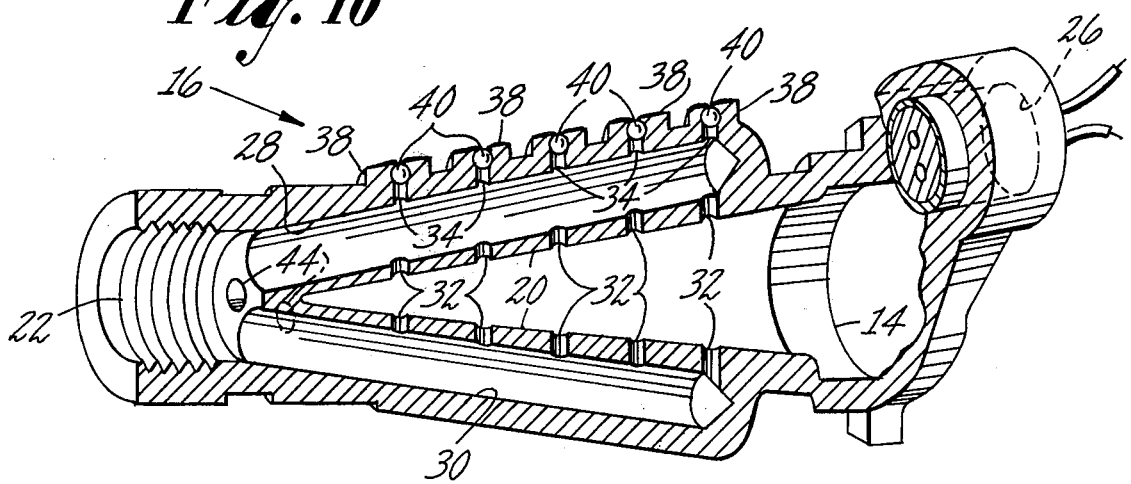

HOT MELT DISPENSER AND METHOD OF MAKING ITS MELT BODY

BACKGROUND OF THE INVENTION

Thermoplastic material such as adhesive, supplied in an elongated, flexible rod, for instance, as disclosed in U.S. Pat. No. 2,874,084, or other solid, granular or particulate form is desirably supplied on demand to a point of application and as reduced to liquid form. Portable thermoplastic cement dispensers wherein manual feeding is employed is disclosed, for example, in U.S. Pat. No. 3,204,828 issued Sept. 7, 1965, in the name of H. C. Paulsen, and in U.S. Pat. No. 3,298,572 issued Jan. 17, 1967, in the name of A. E. Newton. A similar tool embodying mechanized means for feeding the thermoplastic into a melt chamber is disclosed in U.S. Pat. No. 3,743,142 issued in the names of the present joint inventors. Additionally, in endeavors to provide improved thermoplastic melting and applying systems for use in hand held extruders, illustrative disclosures have been made in U.S. Pat. Nos. 3,337,093 and 3,776,426, both issued to Mr. Newton.

The disclosure of the last patent referred to above aims at increasing the melting capacity for a given size melt chamber of a through-feed adhesive extruder. As therein shown the extruder comprises the configuration of the chamber, a milled collecting manifold, and interconnecting by-passes in the form of transversely milled channels which connect with grooved-out portions of the chamber for relieving the chamber of the thermoplastic as it is progressively liquefied. While melt bodies of the type just identified have proven commercially advantageous in both industrial and consumer hot melt cementing devices, it is desirable even further to enhance melting capacity while providing a melt body of simpler construction and lower unit cost.

SUMMARY OF THE INVENTION

In view of the foregoing it is a main object of this invention to provide an improved hot melt body for progressively converting thermoplastic material to be applied or deposited in liquid state.

Another object of the invention is to provide, for use in a device for melting end portions of thermoplastic being fed thereto, a basically one-piece melt body of high melt capacity but having relatively low cost construction features.

Yet another object of the invention in its method aspect is directed toward a novel series of steps for efficiently transforming a one-piece casting into a hot melt flow-through body. More specifically, the method contemplates forming an axial by-pass in a casting, interconnecting the by-pass to a frusto-conically cast hot melt chamber by a series of radial bleeder holes formed in the casting, and sealing the outer ends of the holes, thus affording advantageous manufacturing technique which is economical without suffering loss of melt capacity.

Briefly, as herein shown, in a preferred embodiment an elongated one-piece cast body comprises a generally conic or frusto-conical melt chamber having a generally smooth wall surface and a cavity adjacent that surface for accommodating a heater, a pair of manifold by-passes extending in the body from an outlet end generally parallel to but spaced from opposed walls of the chamber, at least one axial auxiliary channel to connect the smaller end of the melt chamber to the outlet end of the body, and axially spaced bleeder holes along at least one side of the body, and these holes being radially drilled for interconnecting the melt chamber to the by-passes, the holes being closed at their outer ends.

BRIEF DESCRIPTION OF THE DRAWINGS

The foregoing and other features of the invention will now be more particularly described in connection with an illustrative hot melt body, and with reference to the accompanying drawings thereof:

FIG. 1 is a view in side elevation of a one-piece cast hot melt body for reducing and dispensing thermoplastic rod cement, an adaptor and nozzle being shown attached;

FIG. 2 is a view corresponding to FIG. 1 but with the body turned 90° about a longitudinal axis;

FIG. 3 is a view looking in the direction of the arrow in FIG. 2 and showing the inlet end;

FIG. 4 is a partly sectional view of the body shown in FIGS. 1 and 2 when further turned about its longitudinal axis;

FIG. 5 is an axial section of the body shown in FIG. 2 and indicating a main melt chamber and bleeder holes;

FIG. 6 is a section taken on the line VI—VI in FIG. 5;

FIG. 7 is a partly sectional view of the body shown in FIG. 5 when looking in the direction of the vertical arrow therein and indicating auxiliary channels;

FIG. 8 is a perspective view of the body with portions broken away and showing the relation of the melt chamber to the by-passes, channels and bleeder holes;

FIG. 9 is a perspective, diagrammatic view of the thermoplastic material as it progressively advances in the body and is reduced thereby; and FIG. 10 is another perspective view of the body with portions broken away.

DESCRIPTION OF PREFERRED EMBODIMENT

It will be understood that thermoplastic material to be melted and dispensed may be of different physical forms, and accordingly no particular manual or powered feeding means is herein shown for progressively advancing it. It is assumed herein for purposes of illustration that the material is initially in the form of a flexible, elongated, generally circular-sectioned length of thermoplastic rod cement 12 (FIG. 9) which is to be moved forward endwise as it is reduced. A leading end of the rod cement 12 is introduced into an inlet passage 14 (FIGS. 3, 5, 7) at one end of a melt body generally designated 16 with which this invention is primarily concerned (FIGS. 1–8 and 10), and preferably through a detachable tubular insulating adaptor 18. Desirably the body 16 is formed initially as a one-piece casting, though it will be appreciated that the body may be cast in more than one piece when desired and, for instance, in two parts as suggested by the U.S. Pat. No. 3,776,426 referred to above. It is found that casting the body 16 in a single aluminum alloy block insures relatively low manufacturing cost, and good heat conductivity with conveniently low weight conductive to easy maneuverability. It will be apparent that the body may be made from other materials than aluminum and cast or otherwise formed without departing from this invention.

The casting body 16 is formed with a main melt chamber 20 (FIGS. 3, 5, 7, 8, 10) which is largely conic or frusto-conical and has been shaped as by a core (not shown) disposed substantially from the larger end of the chamber and the inlet passage 14 toward a smaller outlet passage 22 at the other end of the casting. A suitable discharge nozzle 24 the structural details of which are not relevant to this invention is threaded into the passage 22 for receiving the flow of cement 12 when liquefied as will hereinafter be described. Preferably the body 16 comprises a cavity 26 (FIGS. 3, 4, 10) for accommodating a heater (not shown), and the cavity is axially coextensive with and adjacent to portions of the melt chamber and of at least one by-pass 28 (FIGS. 5, 8, 10) next to be explained.

As the rod cement 12 moves forwardly endwise in the melt chamber 20, heat conducted through its generally smooth, conic walls melts the "skin" or outer layers of the rod cement (which is itself commonly a poor heat conductor) thus progressively diminishing the cross sections and circumference of the rod. In order to relieve the melt chamber of the liquefied cement as the rod is reduced, the by-pass 28 and desirably at least a second by-pass 30 are bored from the outlet passageway 22 and substantially parallel to, but spaced from, the wall of the chamber 20. (It will be understood that alternatively the by-passes could be drilled from their opposite ends which would then be sealed.) When two by-passes 28, 30 are utilized as shown in FIGS. 5, 8 and 10, they extend on opposite sides of the body from the chamber, each by-pass serving as a manifold for receiving fluid cement via a plurality of approximately radial, axially spaced bleeder holes 32 interconnecting the by-passes to the melt chamber. The holes 32 are, for manufacturing purposes, preferably arranged in a straight row, extend diametrically through the walls of the chamber, and have radial extensions 34 from the by-pass 28 only reaching through the outer body wall. Drilling these holes 32 in diametric bores as described facilitates their being sealed against fluid flow as will next be explained.

Each extension 34 emerges from a protuberance or boss 38 formed on the body and may thus provide a deformable lip. An insert or plug preferably in the form of a ball 40, which for ease of handling may be of metal harder than that of the body 16, is press fit into the respective protuberant lips of the bosses 38 which are then swaged over the balls simultaneously to retain the latter and tightly seal the by-pass 28 so as to require fluid therein and/or in by-pass 30 to pass to the outlet 22.

In a design refinement as shown in FIGS. 5–7, the by-passes, 28, 30 may be of uniformly constant diameter and substantially the same, and the larger end portion of the generally conic melt chamber may have its generally smooth wall partly flatted as at 42 (FIG. 7) on opposite sides and partly conical but extending at an angle of about 5° to 18° less to the axis of the chamber 20 than does the wall surface of the chamber at its smaller end portion. This shape desirable results in slightly thicker, stronger walls between the larger end of the melt chamber and the by-passes, and enables all the holes 32 to be effectively used.

In order to avoid trapping adhesive fluid at the smaller end of the melt chamber, at least one, and preferably two, auxiliary axial channels 44 (FIGS. 3, 6) are formed, as by drilling, between the smaller end of the chamber and the outlet 22. The channels 44 desirably have their axes contained in a plane substantially at right angles to a plane containing the axes of the by-passes 28, 30.

For accommodating a melt-controlling thermostat (not shown) the body 16 is desirably formed between the cavity 26 and the larger end of the melt chamber with a bore 46 (FIGS. 1, 7).

Operation of the described hot melt body 16 to dispense fluid cement and its method of construction will now be briefly reviewed. Heat conducted to the walls of the main melt chamber 20 progressively reduces the exterior of the advancing end portion of the rod 12 within the body. The rod 12 and the fluid adhesive flowing therefrom accordingly together occupy space and shape as diagramatically indicated in FIG. 9, which may be compared to the metal configuration of the body as shown in FIGS. 8, 10, for instance. Central and last-to-melt portions of the advancing rod flow out through auxiliary channels 44, 44, whereas radially outer portions of the rod will be bled off, as they are melted, through the holes 32 and the manifold by-passes 28, 30. Flow from the latter merges with that from the channels 44 to exit from the nozzle 24. The essentially smooth wall surfaces of the melt chamber are interrupted by the radial bleeder holes 32. In traversing the melt chamber 20, some small mechanical interference or friction may occur at the inner ends of the holes 32 thus possibly tending to "shave off" softened outer rod fragments which continue to melt; also, some hard contact of the rod exterior is to be advantageously expected in the vicinity of the flats 42 and convex chamber wall surfaces 50, 50 (FIG. 7) beyond the flats where the radii are slightly less than in conic sections at right angles to such convex surfaces.

The melt body configuration and, especially its one-piece cast construction enable high melt capacity to be attained in a light weight dispenser economical to build and operate.

Having thus described our invention and what we claim as new and desire to secure as Letters Patent of the United States is:

1. In apparatus for progressively melting and dispensing thermoplastic material, an elongated body, the body having a generally frusto-conical hot melt chamber extending substantially from an inlet for the material in its solid form and toward a relatively smaller outlet for the material when liquefied, said chamber being defined by an essentially smooth wall, the body being constructed for heat transfer relation to a heater, at least one manifold by-pass extending generally parallel to the chamber wall, at least one axially drilled auxiliary channel in the body interconnecting the smaller end of the melt chamber to the body outlet, and a plurality of radially drilled holes spaced along the chamber substantially in a line to bleed off and conduct the material as melted into the by-pass.

2. A hot melt body as in claim 1 wherein some circumferentially opposite wall surfaces of the melt chamber have radii of curvature different than those of intermediate wall surfaces, and the lengths of said holes diminish progressively as the body outlet is approached.

3. A hot melt body as set forth in claim 1 wherein the walls of the holes and of the by-pass are wholly circular in section and of constant diameter, and the walls of the chamber, except as interrupted by the radial holes, have smooth surfaces partly circular in cross section and partly flatted on opposite sides nearer the larger end portion.

4. A melt body as in claim 1 wherein a pair of said manifold by-passes is provided of uniform diameter on opposite sides of the body from its melt chamber, only one of the by-passes has its bleeder holes extending, respectively, in alignment through both the opposite walls of the melt chamber and the opposite walls of the one by-pass, and means for sealing the radially outer holes in said one by-pass.

5. A melt body as in claim 4 wherein, for sealing the ends of said holes adjacent to the exterior of the body, a plurality of elements are press fit into the respective holes, and metal of the body surrounding the respective holes is swaged into overlapping relation to the elements.

6. A melt body as in claim 5 wherein the larger end of the melt chamber is defined by a wall surface extending at an angle of about 5 - 18 degrees less to the axis of the chamber than does the wall surface of the chamber at its smaller end portion.

7. The method of making a hot melt body for reducing thermoplastic material progressively comprising the steps of providing an elongated metal casting having a main melt chamber formed by a conic core, the larger end of the chamber opening to an inlet passageway and the smaller end of the chamber being axially spaced from an outlet passageway in the casting, boring a by-pass parallel to but spaced from the wall of the chamber and extending from the outlet passageway, forming an auxiliary channel between the outlet passageway and the smaller end of the melt chamber, forming a plurality of axially spaced, radial bleeder holes which extend through the outside wall of the casting to interconnect the melt chamber to the by-pass, press-fitting a metal seal element into an end of each hole where it emerges from the outside wall of the casting, and then swaging portions of the outside wall of the casting into overlapping relation to the elements to effectively retain them and seal said holes.

8. The method of claim 7 wherein the bleeder holes are formed in a straight row.

9. The method of claim 8 wherein the seal elements are in the form of balls, and the melt body is formed with external deformable protrusions swagable into overlapping relation with the balls.

* * * * *